April 22, 1924.
W. F. CHAPMAN
1,491,199
METHOD AND MEANS FOR PREVENTING SKIDDING
Original Filed May 29, 1916
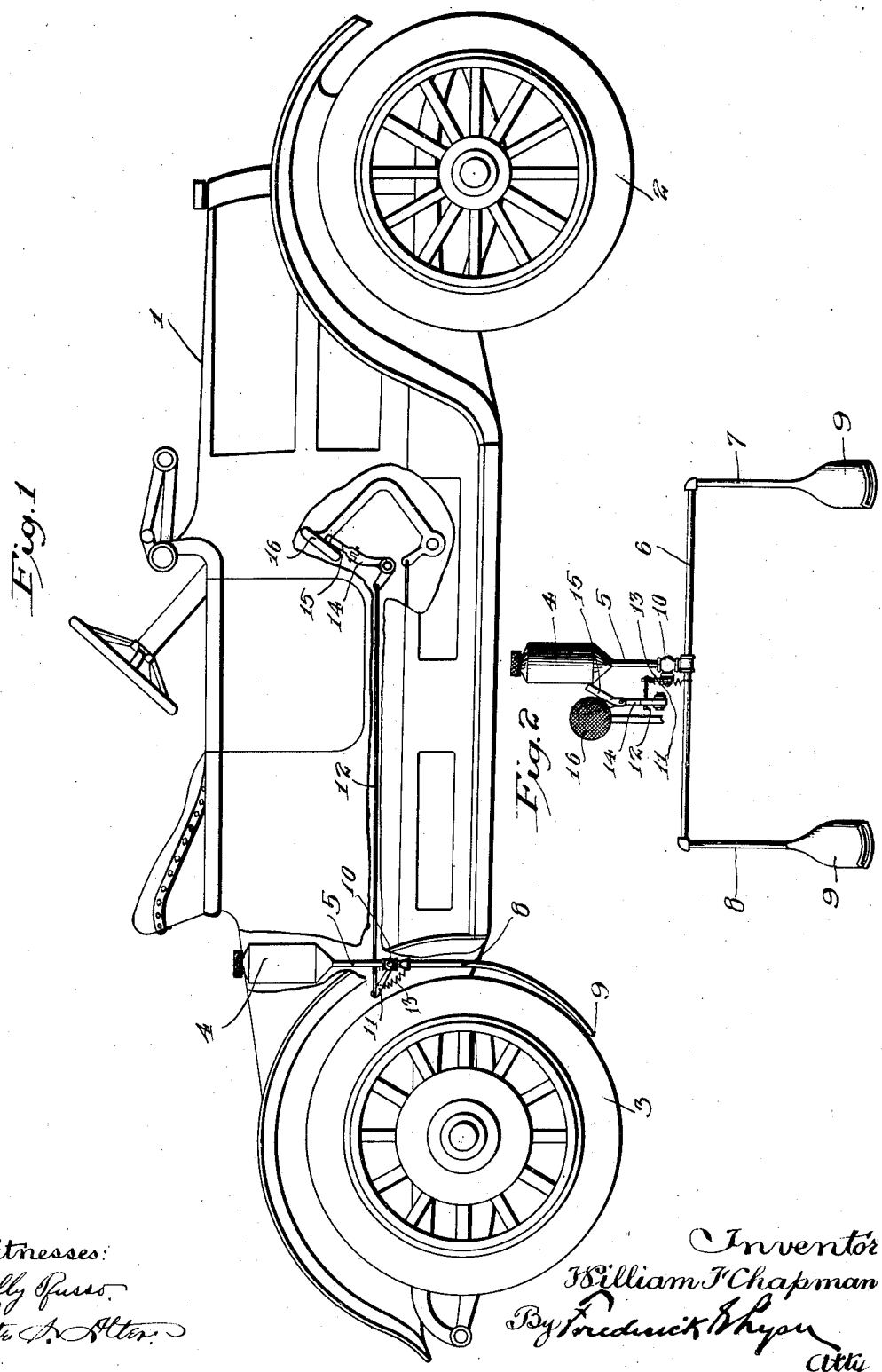

Patented Apr. 22, 1924.

1,491,199

UNITED STATES PATENT OFFICE.

WILLIAM F. CHAPMAN, OF LOS ANGELES, CALIFORNIA.

METHOD AND MEANS FOR PREVENTING SKIDDING.

Application filed May 29, 1916, Serial No. 100,599. Renewed September 28, 1923.

*To all whom it may concern:*

Be it known that I, WILLIAM F. CHAPMAN, a citizen of the United States, residing at Los Angeles, in the county of Los Angeles and State of California, have invented a new and useful Method and Means for Preventing Skidding, of which the following is a specification.

This invention relates to means for and a method of preventing motor vehicles from skidding upon wet streets, and consists in the application of an anti-skidding material from a vehicle to the street directly in the path of the vehicle so that the tires come into contact with said material and are prevented from skidding.

An object of the invention is to provide a simple and reliable means to be carried by an automobile which may be operated at will to apply water soluble anti-skidding material to the street in the path of the wheels of the automobile.

A further object is to provide means of the character described which will operate simultaneously with the application of the brakes of the vehicle to which it is attached.

Other objects and advantages may appear from the subjoined detail description.

The accompanying drawings illustrate the invention:

Figure 1 is a side elevation of an automobile showing it equipped with my invention; and Fig. 2 is a diagrammatic view.

Referring to the drawings, 1 designates an automobile of the ordinary type, which includes front and rear wheels 2 and 3.

In carrying out my invention I employ a suitable receptacle 4 which is adapted to contain a quantity of water soluble anti-skidding material. This material may consist of alum which is known to have anti-skidding qualities and is water soluble.

Leading downwardly from the receptacle 4 is a pipe 5 having connection with a horizontal discharge pipe 6. Depending from the ends of the discharge pipe 6 are vertical pipes 7 and 8, each of which is provided with an enlarged flat mouth 9. These mouths 9 are curved in cross section and located in close proximity to the tires 3 of the automobile in spaced relation, but close to the street.

A valve 10 controlling the passage of material through the pipe 5 is carried by said pipe 5 and includes a lever 11 to one end of which is connected an operating rod 12. The valve is normally held in closed position by a spring 13 which is connected with the pipe 5 and the lever 11.

A bell crank 14 is pivoted upon the floor of the automobile and is connected with the rod 12. The bell crank 14 is provided with a hinged extension 15 upon its upper end, and said extension is adapted to be moved into and out of operative relation to the brake pedal 16 of the automobile.

It will thus be seen that the foregoing construction provides for the distribution or application of the water soluble anti-skidding material to the street when the brakes are operated. Normally the extension 15 is free from engagement with the pedal 16 so that said pedal may be operated in the customary manner without opening the valve 10. To apply the material the extension 15 is moved so as to lie in operative relation to the pedal 16, that is, the extension engages underneath the head of the pedal. When the pedal is pushed downwardly the bell crank 14 will be rocked, causing a pull to be communicated to the lever 11 through the rod 12, and the valve 10 to open. This will allow the material in the receptacle 4 to pass through the pipes 5, 6, 7 and 8 and be discharged through the mouths 9 upon the tires of the rear wheels 3 and upon the street in the path of the wheels 3.

The adhesive qualities of the material prevent skidding of the automobile, and it has been found that alum and like materials prove highly satisfactory.

While I have shown and described means for applying the water soluble anti-skidding material to the tires of the rear wheels 3 of the automobile only and to the street in the path of the tires of said wheels, it is to be understood that means may be employed if desired for applying material to all of the tires of the automobile and in the paths of all of said tires upon the street.

I claim:

In a means for preventing skidding of an automobile, the combination with an automobile, including a brake-operating pedal, a supply of anti-skidding material carried by the automobile, means to direct the material to the street in the path of the wheels of the automobile, and means to control the operation of said last named means including a pedal member having a hinged extension adapted to extend under the brake pedal whereby upon operation of the brake pedal the pedal member is operated and the anti-skidding material is applied.

Signed at Los Angeles, California, this 18th day of May, 1916.

WILLIAM F. CHAPMAN.

Witnesses:
 CHAS. J. CHUNN,
 L. BELLE WEAVER.